Feb. 26, 1924.

J. P. LAMUTH 1,485,277

DIRIGIBLE HEADLIGHTS

Filed May 15, 1922

Inventor

J. P. Lamuth

Witnesses

J. M. Evans

By

Victor J. Evans

Attorney

Feb. 26, 1924.
J. P. LAMUTH
1,485,277
DIRIGIBLE HEADLIGHTS
Filed May 15, 1922    2 Sheets-Sheet 2
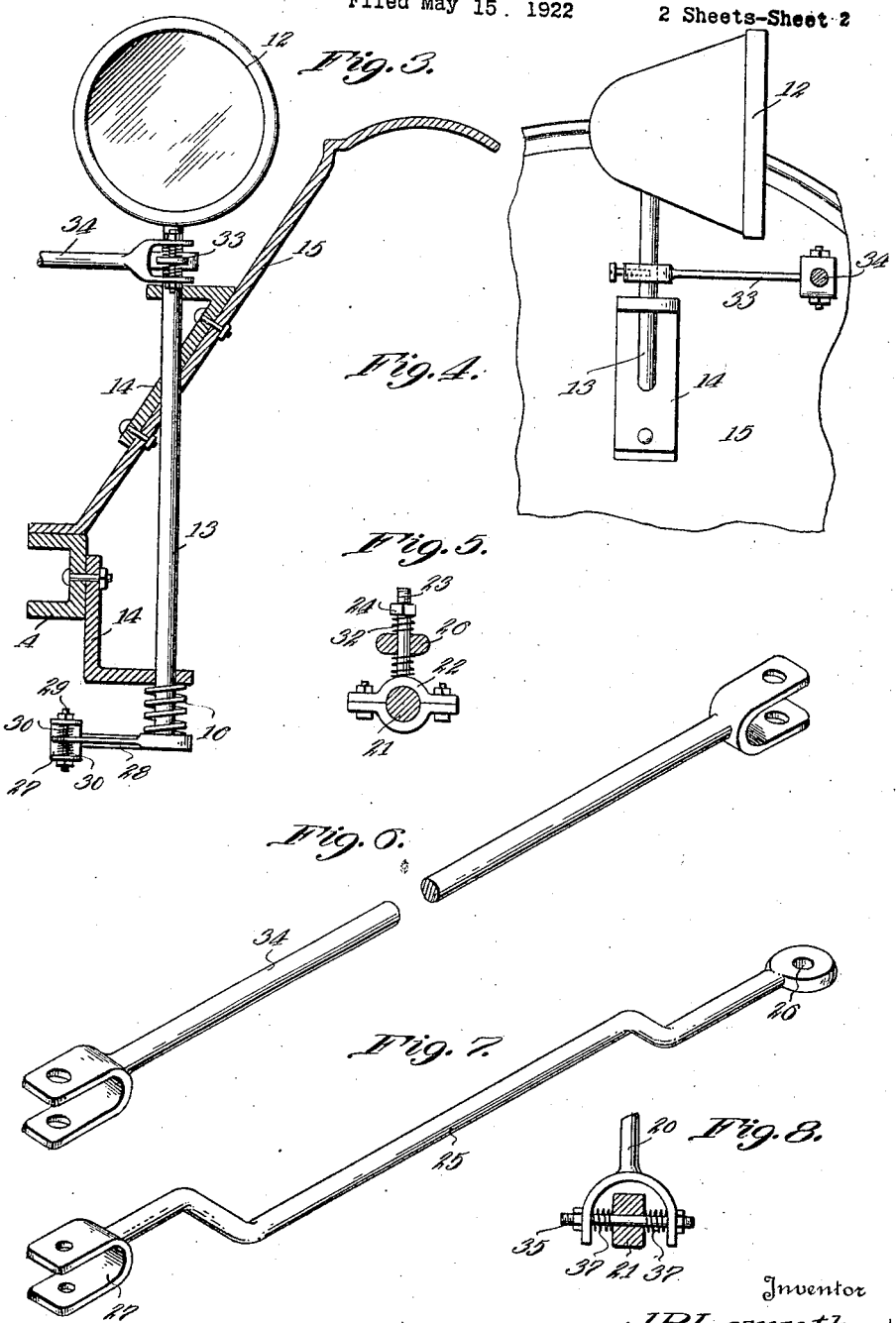
Witnesses
J.M.Evans
Inventor
J.P.Lamuth
By Victor J. Evans
Attorney Patented Feb. 26, 1924.

1,485,277

UNITED STATES PATENT OFFICE.

JOSEPH P. LAMUTH, OF CASPER, WYOMING.

DIRIGIBLE HEADLIGHT.

Application filed May 15, 1922. Serial No. 560,963.

*To all whom it may concern:*

Be it known that I, JOSEPH P. LAMUTH, a citizen of the United States, residing at Casper, in the county of Natrona and State of Wyoming, have invented new and useful Improvements in Dirigible Headlights, of which the following is a specification.

This invention relates to a dirigible headlight for a motor operated vehicle or the like, the invention residing in the construction, combination and arrangement of parts as claimed, whereby the headlights are simultaneously shifted either to the right or to the left incident to the steering of the vehicle, thus maintaining the light rays always in the course pursued by the vehicle to properly illuminate the roadway.

In the drawings forming part of this application, like numerals of reference indicate similar parts in the several views, and wherein:—

Figure 3 is a sectional view taken on line 3—3 of Figure 1.

Figure 4 is a fragmentary view in elevation, showing the manner of mounting one of the headlights on a fender of the vehicle.

Figure 5 is a sectional view taken on line 5—5 of Figure 1.

Figure 6 is a view of the connecting rod for the respective headlights.

Figure 7 is a view of the rod which connects the steering post with one of the lamp standards.

Figure 8 is a sectional view taken on line 8—8 of Figure 1.

Figure 1:
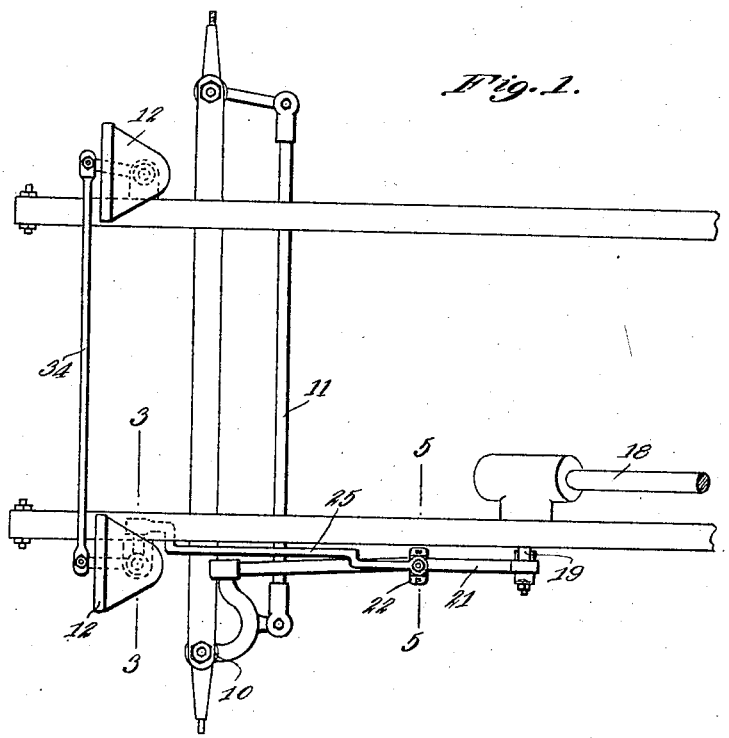
Figure 1 is a top plan view, showing the invention applied to the running gear of a motor operated vehicle.
Figure 2:
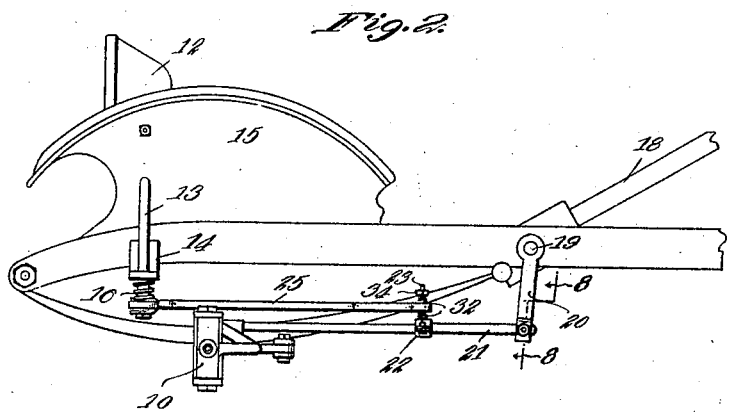
Figure 2 is a fragmentary side elevation.

Referring to the drawings in detail, A indicates a portion of a running gear of a motor operated vehicle, wherein 10 indicates the steering knuckles which are connected by the usual rod 11. The headlights are indicated at 12, and each includes a supporting post 13 mounted in a substantially L-shaped bracket 14 for partial rotation in either direction. There are two of such brackets 14 for each lamp post 13, one of the brackets being secured to the adjacent fender 15, and has its long arm bent at an inclination to conform to the shape of the fender and the other bracket is secured to the frame of the running gear, this arrangement being clearly illustrated in Figure 3. Each lamp post 13 projects beyond the lowermost bracket 14 of each pair, and surrounding the lamp posts beneath said bracket is a coiled spring 16, which is utilized to prevent rattling or vibration of the lamps incident to the travel of the vehicle over rough or irregular surfaces.

The steering post is indicated at 18 and projecting laterally from one side of the frame of the vehicle is a shaft 19 mounted for rotation incident to the rotation of the steering-post 18. Depending from the shaft 19 is an arm 20 to the lower end of which is connected a rod 21, this rod being connected in the usual manner with one of the steering knuckles for turning the front wheels of the vehicle in the usual manner. Embracing the rod 21 is a two-part clamp 22, and rising from one part of this clamp is a bolt 23 equipped with a nut 24. This bolt receives the adjacent extremity of the rod 25. This rod 25 has its end portions offset in opposite direction and thence extended beyond the body portion thereof as illustrated, and one of the end portions is provided with an opening 26 for the reception of the bolt 23, while the opposite end is bifurcated as at 27 and which end is connected to an extension 28 projecting from the adjacent lamp post 13. It will be noted that the spring 16 surrounding the lower portion of the said lamp post has one end bearing against this extension 28, while the other end of the spring bears against the frame of the vehicle for the purpose mentioned. The bifurcated extremity 27 of this rod receives a pivot bolt 29 which provides the connection between the rod and the extension 28, and surrounding said pivot bolt 29 above and below said extension, are coiled springs 30, which are also used to eliminate rattling or vibration of the device incident to the travel of the vehicle over rough surfaces. The opposite end 26 of the rod 25 has positioned above and below the coiled springs 32 for the same purpose, these springs surrounding the bolt 23. Projecting from each of the lamp posts are extensions 33, and these extensions are connected together by a transverse rod 34 whereby the headlights are turned in unison, incident to the steering of the vehicle. It will be noted upon inspection of Figure 8, that the rod 21 receives a bolt 35 which provides a connection between the rod 21 and the arm 20, and the lower extremity of this arm 20 is bifurcated. Surrounding this bolt 35 and arranged at opposite sides of the rod 21 are coiled springs 37 to prevent vibration of the parts under conditions above mentioned.

In practice, when the steering post is turned in either direction to steer the vehicle, the rod 21 is moved by reason of its connection with the steering post 18 through the instrumentality of the arm 20, and as the rod 25 is connected with the rod 21, the rod 25 is similarly moved. Movement of this rod 25 partially rotates the adjacent lamp post 13, and as the respective posts are connected by the transverse rod 34, the lamps are turned in unison in the same general direction in which the machine is steered, thereby maintaining the light rays directly in advance of the course pursued by the vehicle.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

What I claim is:—

In a motor operated vehicle, the combination with a steering mechanism thereof, of headlights mounted for simultaneous partial rotation, a substantially L-shaped bracket having its long arm arranged at an inclination and fixed to the inclined portion of the fender of the vehicle, a second L-shaped bracket having its long arm straight and fixed to the frame of the vehicle in depending relation thereto, each of said brackets being provided with aligned openings aligned with an opening in the fender, a post depending from each lamp and adapted to pass through the aligned openings for rotation therein, an extension projecting laterally from the lower end of each post, means surrounding each post and engaging the adjacent bracket and extension respectively for preventing undue vertical movement of the post, a rod having offset ends arranged in opposite directions and thence extended on the body of the rod, one of said ends being enlarged and apertured and the opposite end being bifurcated for receiving the adjacent end of the extension, means associating the apertured end of the rod with the steering mechanism and means bridging the posts of the respective lamps for the purpose specified.

In testimony whereof I affix my signature.

JOSEPH P. LAMUTH.